(12) United States Patent
Lee et al.

(10) Patent No.: US 11,764,020 B2
(45) Date of Patent: Sep. 19, 2023

(54) POLE COMPONENT AND CIRCUIT BREAKER COMPRISING SAME

(71) Applicant: LS ELECTRIC CO., LTD., Anyang-si (KR)

(72) Inventors: Han Joo Lee, Anyang-si (KR); Hong Ik Yang, Anyang-si (KR); Kil Young Ahn, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 188 days.

(21) Appl. No.: 17/432,743

(22) PCT Filed: Jul. 11, 2019

(86) PCT No.: PCT/KR2019/008560
§ 371 (c)(1),
(2) Date: Aug. 20, 2021

(87) PCT Pub. No.: WO2020/171310
PCT Pub. Date: Aug. 27, 2020

(65) Prior Publication Data
US 2022/0148836 A1 May 12, 2022

(30) Foreign Application Priority Data
Feb. 22, 2019 (KR) .................. 10-2019-0020839

(51) Int. Cl.
*H01H 71/08* (2006.01)
*H01H 71/02* (2006.01)
(Continued)

(52) U.S. Cl.
CPC ............ *H01H 71/08* (2013.01); *H01H 71/02* (2013.01); *H01H 71/10* (2013.01); *H02B 1/04* (2013.01)

(58) Field of Classification Search
CPC ........ H01H 71/10; H01H 71/02; H01H 71/08; H01H 71/0207; H01H 2033/6613; H01H 33/6606; H02B 1/04
See application file for complete search history.

(56) References Cited

U.S. PATENT DOCUMENTS 5,512,724 A * 4/1996 Binder ................. H01H 33/666
218/139
7,053,327 B2 * 5/2006 Benke .................. H01H 33/666
218/120
(Continued)

FOREIGN PATENT DOCUMENTS

CN 102687228 A 9/2012
EP 3214709 A1 9/2017
(Continued)

OTHER PUBLICATIONS

International Search Report for related International Application No. PCT/KR2019/008560 report dated Aug. 27, 2020; (5 pages).
(Continued)

*Primary Examiner* — Edwin A. Leon
(74) *Attorney, Agent, or Firm* — K&L Gates LLP

(57) ABSTRACT

A pole component (and circuit breakers including such a pole components) may be provided that include an upper terminal; a lower terminal disposed a predetermined distance away from the upper terminal; a breaker part assembly including a fixed electrode, which is electrically connected to the upper terminal, a movable electrode, which is selectively connected to the fixed electrode, and a current conducting portion which is fixed to the movable electrode and electrically connected to the lower terminal; an outer housing having an open lower surface and accommodating the upper terminal, lower terminal and breaker part assembly;
(Continued)

and an inner housing which is detachably disposed between the outer housing and breaker part assembly.

14 Claims, 8 Drawing Sheets

(51) Int. Cl.
     *H01H 71/10*      (2006.01)
     *H02B 1/04*      (2006.01)

(56) References Cited

U.S. PATENT DOCUMENTS

| | | | |
|---|---|---|---|
| 2010/0072045 | A1 | 3/2010 | Freundt et al. |
| 2017/0338071 | A1* | 11/2017 | Brandt ................ H01H 33/664 |

FOREIGN PATENT DOCUMENTS

| | | | |
|---|---|---|---|
| JP | 2006202592 A | 8/2006 |
| JP | 2009505334 | 2/2009 |
| JP | 2011040275 A | 2/2011 |
| JP | 2012049069 A | 3/2012 |
| JP | 5215237 B2 | 6/2013 |
| JP | 2013125717 A | 6/2013 |
| JP | 2014002876 A | 1/2014 |
| JP | 2015032406 A | 2/2015 |
| KR | 20180107547 A | 10/2018 |
| KR | 1020180131479 A | 12/2018 |
| WO | 2013094493 A1 | 6/2013 |

OTHER PUBLICATIONS

Written Opinion for related International Application No. PCT/KR2019/008560 report dated Aug. 27, 2020; (5 pages).
Office Action for related Japanese Application No. 2021-549145; action dated Sep. 6, 2022; (5 pages).
Extended European Search Report for related European Application No. 19916143.1; action dated Dec. 2, 2022; (47 pages).
Notice of Allowance for related Japanese Application No. 2021-549145; action dated Jan. 10, 2023; (3 pages).
Office Action for related Chinese Application No. 201980092675.4; action dated Feb. 21, 2023; (6 pages).

* cited by examiner

POLE COMPONENT AND CIRCUIT BREAKER COMPRISING SAME

CROSS-REFERENCE TO RELATED APPLICATIONS

The present application is a National Stage of International Application No. PCT/KR2019/008560 filed on Jul. 11, 2019, which claims the benefit of Korean Patent Application No. 10-2019-0020839, filed on Feb. 22, 2019, with the Korean Intellectual Property Office, the entire contents of each hereby incorporated by reference.

FIELD

The present disclosure relates to a pole component having an improved structure and a circuit breaker including the same.

BACKGROUND

In an industrial site such as a power plant or substation, a switchboard is installed for various purposes such as operation or control of electric power and operation of an electric motor, and various electronic devices including a circuit breaker can be disposed in this switchboard.

Generally, the circuit breaker can be roughly classified into a frame disposed in the switchboard and a pole component disposed on the frame, and the pole component is generally encapsulated with plastic or another insulating material due to characteristics of a switchboard function.

As related art for such this pole component, there is Korean Patent Registration No. 10-1034342 (title of the disclosure: Method of producing a circuit breaker part for low voltage, medium voltage, and high voltage switching equipment and a circuit breaker part corresponding thereto).

This related art includes an insulating housing which seals a breaker part assembly disposed in the pole component by an injection method.

However, although this related art implements the insulating housing as a single layer or a plurality of layers, mechanical strength cannot be guaranteed, and an applicable rated voltage can be limited due to weak insulating performance.

Specifically, a conventional insulating housing is injection-molded with an open lower portion to dispose a breaker part assembly therein, and the conventional insulating housing under injection-molding cannot include a structure capable of guaranteeing insulation and mechanical strength therein.

Further, in the pole component according to the related art, a gap between a current conducting portion and a lever of the breaker part assembly is widened to ensure insulation performance, and this method can eventually increase an overall length of the pole component, and thus can hinder space utilization in the switchboard, or cause a problem of increasing a size of the switchboard.

SUMMARY

The present disclosure has been devised to solve the above problems, and an object of the present disclosure is to provide a pole component having an improved structure so that an insulating property and mechanical strength may be improved while maintaining an overall size of the pole component and a circuit breaker including the same.

One aspect of the present disclosure provides a pole component including: an upper terminal; a lower terminal disposed to be spaced apart from the upper terminal at a predetermined interval; a breaker part assembly including a fixed electrode electrically connected to the upper terminal, a movable electrode selectively connected to the fixed electrode, and a current conducting portion fixed to the movable electrode and electrically connected to the lower terminal; an outer housing having an open lower surface to accommodate the upper terminal, the lower terminal, and the breaker part assembly; and an inner housing detachably disposed between the outer housing and breaker part assembly.

Further, the pole component may further include a lever part which spaces the movable electrode apart from the fixed electrode when an external force is applied.

In addition, the lever part may include: an insulating rod disposed under the movable electrode; a movable member fixed to the insulating rod; a hinge pin disposed through the outer housing; a lever having one end formed with a hinge hole through which the hinge pin passes, the other end accommodated in the outer housing to be exposed to the outside of the outer housing, and a middle fixed to the movable member; and an elastic body disposed between the movable member and the lever.

In addition, the inner housing may be disposed in the outer housing to come into contact with at least one of the lower terminal, an inner surface of the outer housing, the breaker part assembly, and the lever part.

In addition, the inner housing may include: a plate-shaped front portion disposed to face the inner surface of the outer housing; and a pair of side surface portions formed to extend from both sides of the front portion in a direction toward the breaker part assembly.

In addition, a seating groove recessed in a shape corresponding to an outer surface of the lower terminal may be formed at an upper side of the front portion.

In addition, hinge grooves may be formed in the pair of side surface portions so that the hinge pin may pass therethrough.

In addition, the inner housing may further include at least one or more first reinforcement parts each having one end and the other end respectively disposed at the pair of side surface portions.

In addition, the first reinforcement part may have a plate shape and may be integrally formed with the inner housing.

In addition, the inner housing may further include: at least one or more second reinforcement parts formed to extend from the front portion to face the pair of side surface portions; and at least one or more third reinforcement parts each having one end and the other end disposed between the second reinforcement parts and the pair of side surface portions.

In addition, the pole component may further include at least one or more fourth reinforcement parts formed between the second reinforcement parts and the pair of side surface portions to face the second reinforcement parts or the pair of side surface portions, and each having one end and the other end respectively disposed at the first reinforcement part and the third reinforcement part.

In addition, the inner housing may further include a fifth reinforcement part having one side surface formed in a shape partially corresponding to an outer surface of the insulating rod to be disposed to face the insulating rod.

Meanwhile, another aspect of the present disclosure provides a circuit breaker including: the pole component; and a frame accommodated in a switchboard and in which at least one or more pole components are disposed.

Further, the frame may be formed with a first hole, the outer housing may be formed with a second hole facing the first hole, the inner housing may be formed with a third hole facing the first hole and the second hole, and the frame may further include fastening bolts which are fastened through the first hole to the third hole.

In addition, the inner housing may further include a cylindrical sixth reinforcement part having a shape corresponding to the third hole and protruding in a direction toward the breaker part assembly.

According to the present disclosure, it is possible to improve the durability and safety of a pole component by including an inner housing having a structure in consideration of insulation properties and mechanical strength between an outer housing and a breaker part assembly.

Further, according to the present disclosure, it is possible to implement easy maintenance and repair of a circuit breaker by disposing the inner housing in the outer housing in an easily detachable structure.

DETAILED DESCRIPTION

Figure 1:
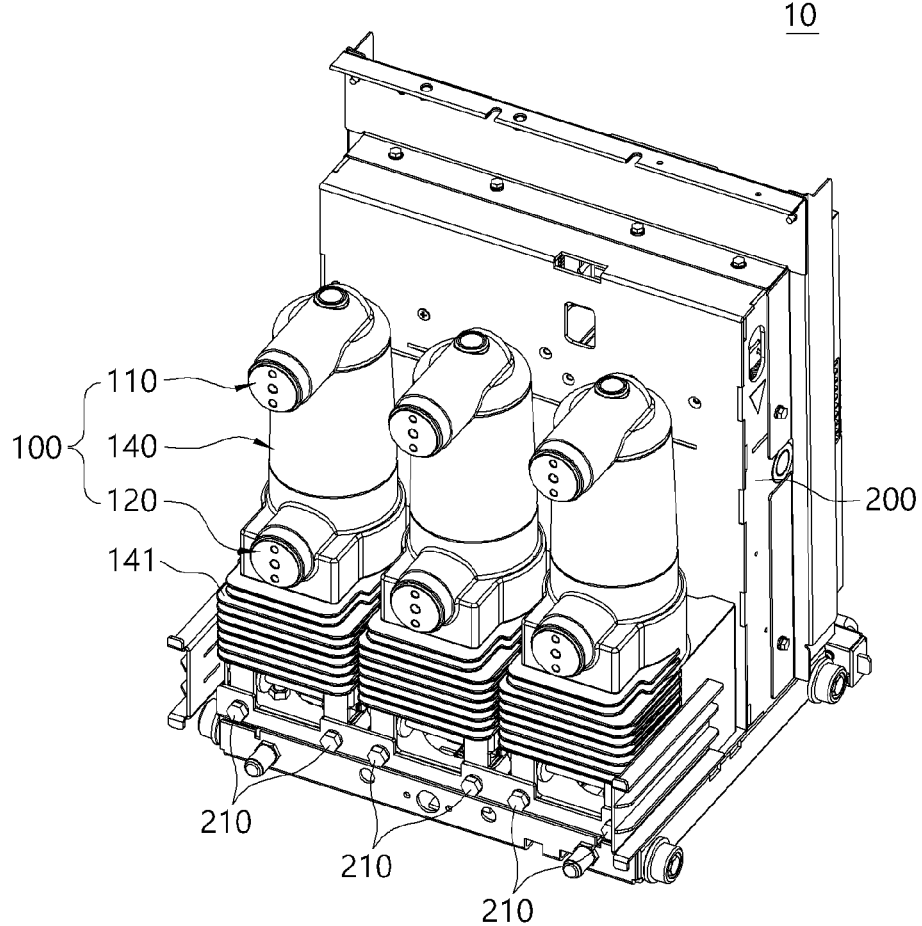
FIG. 1 is a perspective view of a circuit breaker according to an embodiment of the present disclosure.

Here, preferable embodiments of the present disclosure will be described in detail with reference to the accompanying drawings.

Unless otherwise defined, all terms in this specification have the same general meanings understood by those skilled in the art, and the terms used in this specification follow the definitions used in this specification when conflicting with the general meanings of the terms.

However, the disclosure which will be described below is only for describing the embodiments of the present disclosure, and not for limiting the scope of the present disclosure, and the same reference numerals used throughout the specification indicate the same components.

Figure 2:
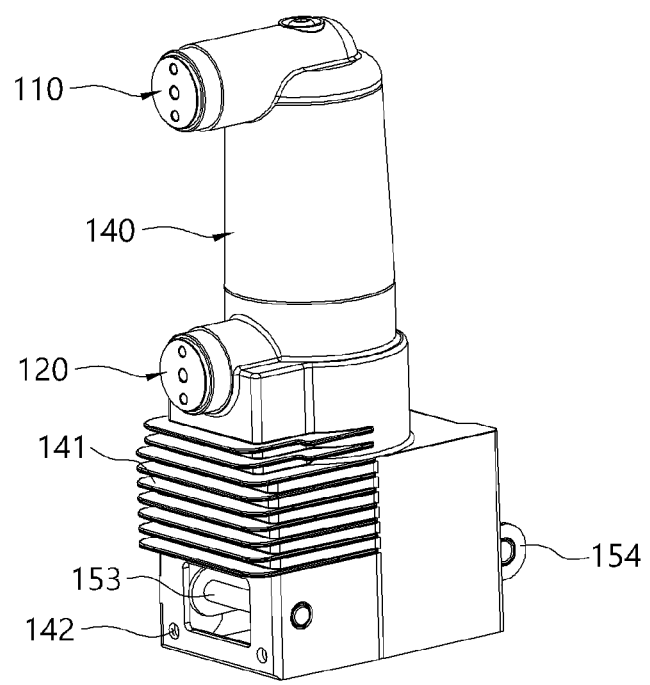
FIG. 2 is a perspective view of a pole component according to the embodiment of the present disclosure.
Figure 3:
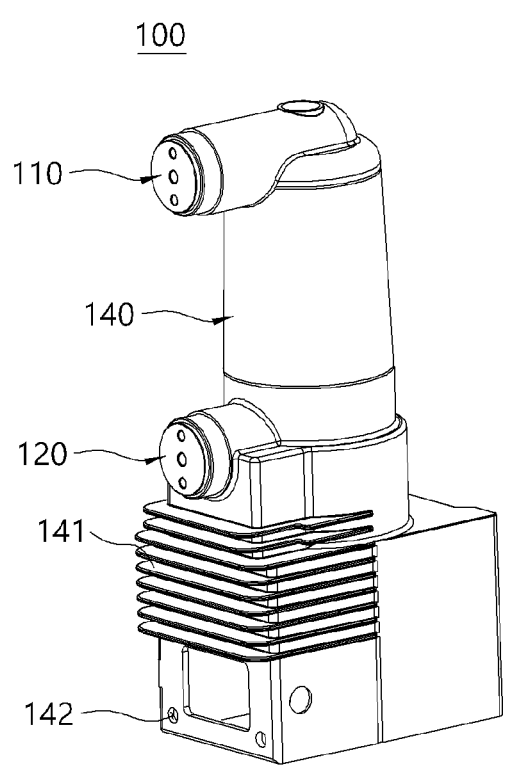
FIG. 3 is a view in which a breaker part assembly, a lever part, and an inner housing are removed from the pole component according to the embodiment of the present disclosure.
Figure 4:
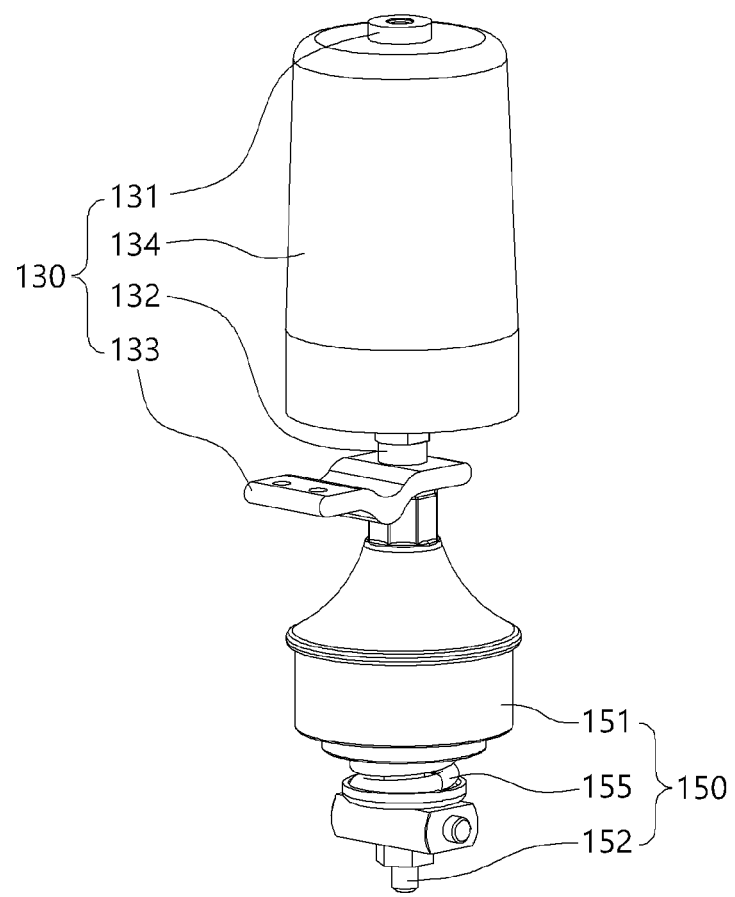
FIG. 4 is a perspective view of a breaker part assembly according to the embodiment of the present disclosure.
Figure 5:
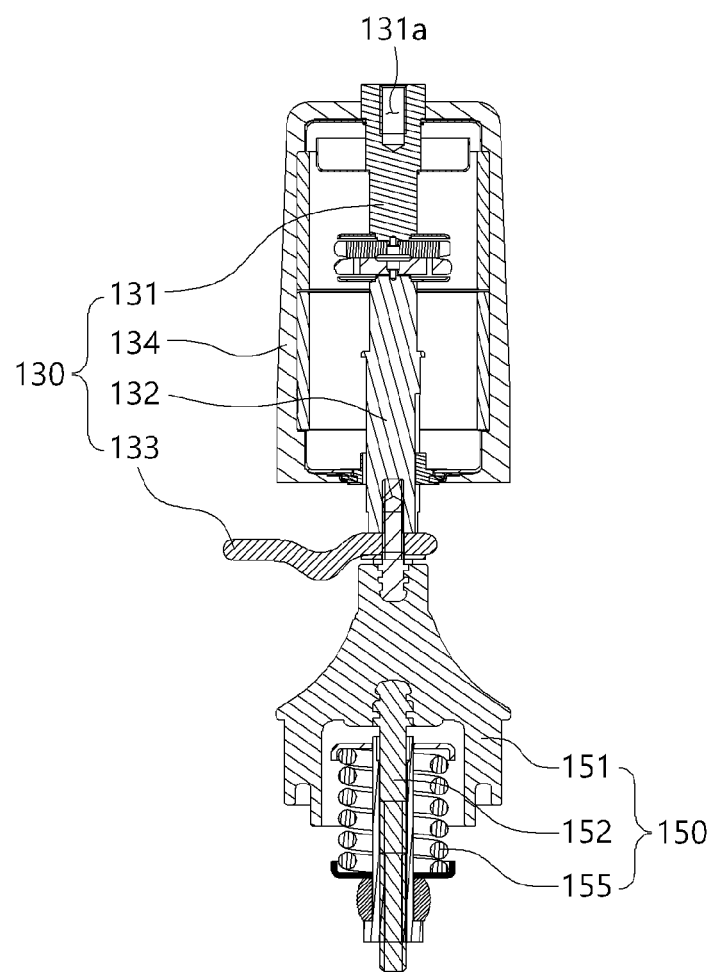
FIG. 5 is a side-sectional view of FIG. 4.
Figure 6:
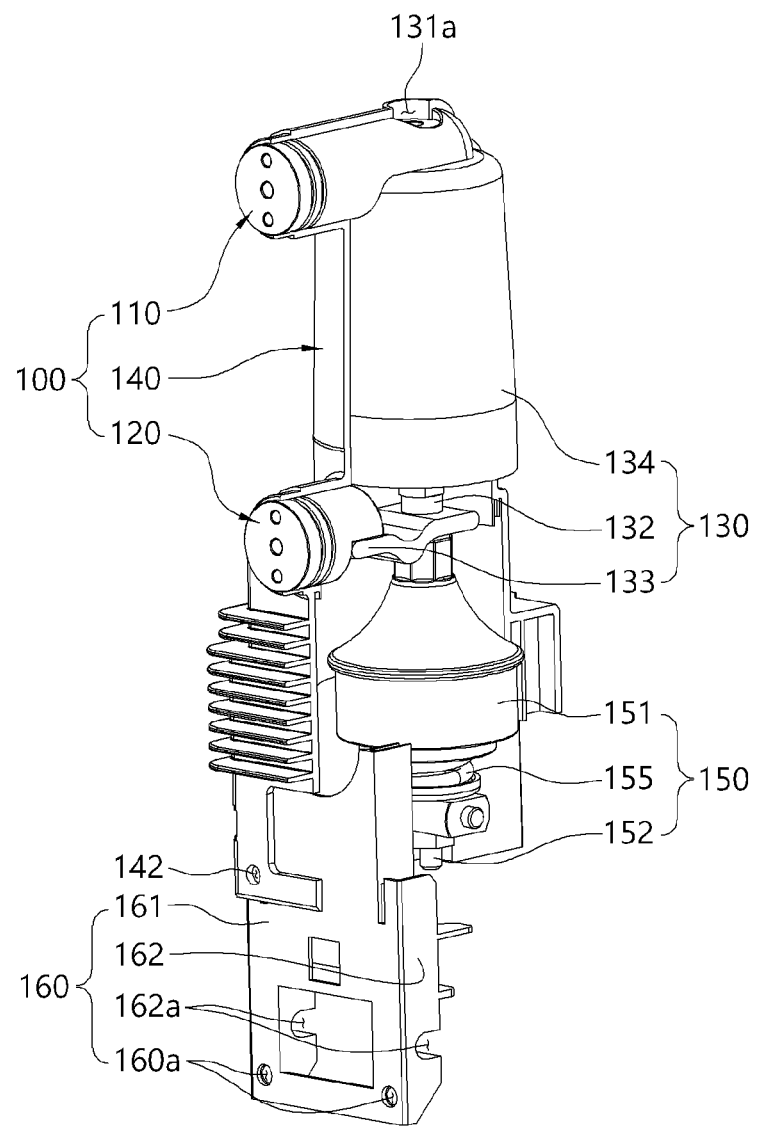
FIG. 6 is a side-sectional perspective view of a state before an inner housing is coupled to the pole component according to the embodiment of the present disclosure.
Figure 7:
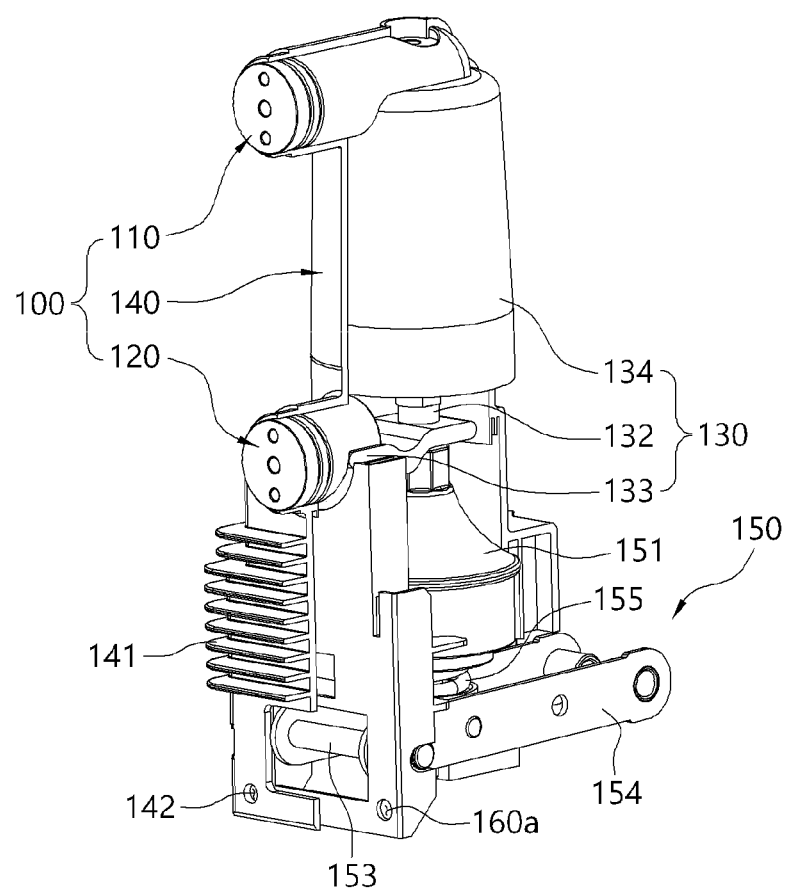
FIG. 7 is a side-sectional perspective view of FIG. 2.
Figure 8:
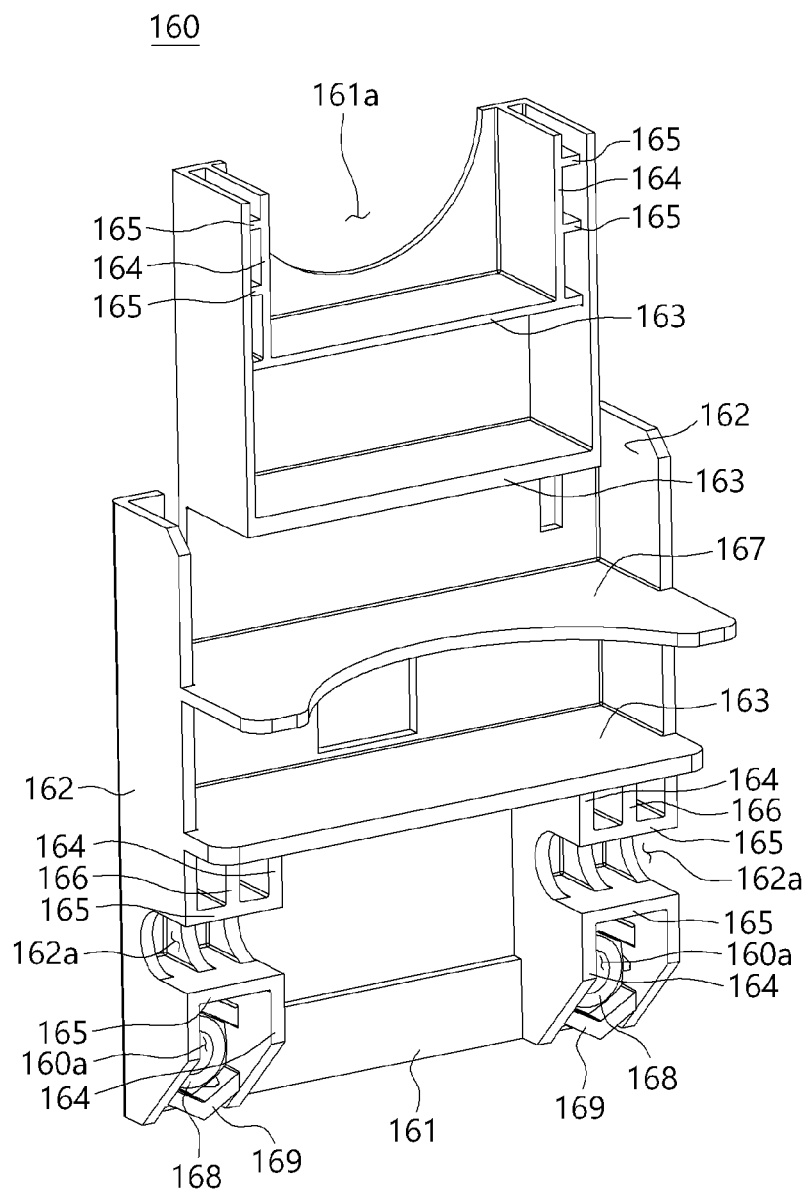
FIG. 8 is a perspective view of the inner housing according to the embodiment of the present disclosure.

FIG. 1 is a perspective view of a circuit breaker according to an embodiment of the present disclosure, FIG. 2 is a perspective view of a pole component according to the embodiment of the present disclosure, FIG. 3 is a view in which a breaker part assembly, a lever part, and an inner housing are removed from the pole component according to the embodiment of the present disclosure, FIG. 4 is a perspective view of a breaker part assembly according to the embodiment of the present disclosure, FIG. 5 is a side-sectional view of FIG. 4, FIG. 6 is a side-sectional perspec-tive view of a state before an inner housing is coupled to the pole component according to the embodiment of the present disclosure, FIG. 7 is a side-sectional perspective view of FIG. 2, and FIG. 8 is a perspective view of the inner housing according to the embodiment of the present disclosure.

Referring to FIGS. 1 to 8, a circuit breaker 10 according to the embodiment of the present disclosure may roughly include a pole component 100 and a frame 200.

The pole component 100 may include an upper terminal 110, a lower terminal 120, a breaker part assembly 130, an outer housing 140, a lever part 150, and an inner housing 160.

The upper terminal 110 and the lower terminal 120 may be electrically connected to an external terminal (not shown), and may be disposed to face a door direction of a switch box (not shown).

Further, the lower terminal 120 may be disposed to be spaced apart from the upper terminal 110 at a predetermined interval so that electrical connection with the upper terminal 110 may be blocked.

The breaker part assembly 130 may electrically connect or block the upper terminal 110 and the lower terminal 120.

Specifically, the breaker part assembly 130 may include a fixed electrode 131 electrically connected to the upper terminal 110, a movable electrode 132 selectively connected to the fixed electrode 131, and a current conducting portion 133 fixed to the movable electrode 132 to be electrically connected to the lower terminal 120.

Here, the fixed electrode 131 is fixed to the inside of a body 134 made of an insulating material, and the body 134 may be inserted into and attached to the outer housing 140 which will be described later.

Further, in order to fix the fixed electrode 131, the body 134, and the outer housing 140, a fastening groove 131a for bolt fastening may be formed in an upper surface of the fixed electrode 131.

A part of the movable electrode 132 may be disposed to be vertically movable in the body 134, and an upper surface of the movable electrode 132 may come into contact with a lower surface of the fixed electrode 131 due to a restoring force of an elastic body 155 which will be described later.

The current conducting portion 133 may be disposed in a direction approximately perpendicular to a longitudinal direction of the movable electrode 132 to come into contact with the lower terminal 120.

Here, the current conducting portion 133 may be formed of a flexible material which may be electrically connected to the lower terminal 120 despite movement of the movable electrode 132, for example, may be manufactured by overlapping several thin copper plates.

That is, the meaning that the movable electrode 132 is selectively connected to the fixed electrode 131 may mean a state in which the movable electrode 132 is electrically energized by coming into contact with the fixed electrode 131 or is spaced apart from the fixed electrode 131 to be electrically blocked.

The outer housing 140 may have an open lower surface to accommodate the upper terminal 110, the lower terminal 120, and the breaker part assembly 130.

This outer housing 140 may be formed of an insulating material, for example may be formed by an injection-molding method so as to come into close contact with the upper terminal 110, the lower terminal 120, and the body 134 of the breaker part assembly 130.

Further, since the outer housing 140 is fastened to the frame 200 of the circuit breaker 10 which will be described later, at least one strength reinforcement rib 141 may be formed at an outer side to extend to protect inner components from an external force.

The lever part 150 may space the movable electrode 132 apart from the fixed electrode 131 when the external force is applied.

Specifically, the lever part 150 may include an insulating rod 151 disposed under the movable electrode 132, a movable member 152 fixed to the insulating rod 151, a hinge pin 153 disposed to pass through the outer housing 140, a lever 154 having one end formed with a hinge hole through which the hinge pin 153 passes, the other end accommodated in the outer housing 140 to be exposed to the outside of the outer housing 140, and a middle fixed to the movable member 152, and the elastic body 155 disposed between the movable member 152 and the lever 154.

Here, the elastic body 155 may be a coil spring disposed to accommodate an outer side of the movable electrode 132.

Further, the insulating rod 151 may be formed of an insulating material to accommodate some or all of the elastic body 155 and the movable member 152, and thus may prevent electrical interference to the breaker part assembly 130 from the lower terminal 120 and the like.

Accordingly, when the other end of the lever 154 is manually or automatically pressurized downward, one end of the lever 154 is fixed by the hinge pin 153 and acts as a hinge point, and accordingly, the movable electrode 132 connected to the lever 154 may be moved downward to be spaced apart from the fixed electrode 131.

Since the elastic body 155 is elongated in this separated state, when the external force is released, the movable electrode 132 may be moved upward due to a restoring force of the elastic body 155 to come into contact with the fixed electrode 131.

In this structure, for more effective strength reinforcement and/or insulation, the present disclosure may further include the inner housing 160 disposed between the outer housing 140 and the breaker part assembly 130.

Further, the inner housing 160 may be detachably disposed in the outer housing 140 for easy maintenance and repair of the breaker part assembly 130 accommodated in the outer housing 140.

In addition, the inner housing 160 may be disposed in the outer housing 140 to come into contact with at least one of the lower terminal 120, the inner surface of the outer housing 140, the breaker part assembly 130, and the lever part 150 to protect the breaker part assembly 130 from an external shock and prevent electrical interference which may be exerted on the breaker part assembly 130 from the lower terminal 120 and the like.

Specifically, the inner housing 160 may include a plate-shaped front portion 161 disposed to face the inner surface of the outer housing 140, and a pair of side surface portions 162 formed to extend from both sides of the front portion 161 in a direction toward the breaker part assembly 130.

A seating groove 161a recessed in a shape corresponding to an outer surface of the lower terminal 120 may be formed at an upper side of the front portion 161, and the seating groove 161a may be disposed to be spaced apart from the lower terminal 120 at a predetermined interval or come into contact with the lower terminal 120 to improve insulation properties and mechanical strength.

Further, hinge grooves 162a may be formed in the pair of side surface portions 162 to allow the hinge pin 153 to pass therethrough, and accordingly, the inner housing 160 may be primarily stably disposed in the outer housing 140.

In addition, the inner housing 160 may further include at least one or more first reinforcement parts 163 each having one end and the other end respectively disposed at the pair of side surface portions 162.

In addition, the first reinforcement part 163 may have a plate shape and may be integrally formed with the inner housing 160.

That is, the first reinforcement part 163 may support the pair of side surface portions 162 to reinforce mechanical strength, and may block electrical interference in a space between the lower terminal 120 and the lever 154.

Further, the inner housing 160 may further include at least one or more second reinforcement parts 164 formed to extend from the front portion 161 to face the pair of side surface portions 162, and at least one or more third reinforcement parts 165 each having one end and the other end disposed between the second reinforcement parts 164 and the pair of side surface portions 162.

This second reinforcement part 164 and the third reinforcement part 165 are structures which are formed in further consideration of mechanical strength, and may be formed, for example, at both sides of the seating groove 161a formed at the upper side of the front portion 161, or may be formed at an upper and/or a lower side of the pair of side surface portions 162 in which the hinge grooves 162a are formed.

For more effective mechanical strength reinforcement, the inner housing 160 may further include at least one or more fourth reinforcement parts 166 formed between the second reinforcement parts 164 and the pair of side surface portions 162 to face the second reinforcement parts 164 or the pair of side surface portions 162, and each having one end and the other end respectively disposed at the first reinforcement part 163 and the third reinforcement part 165.

In addition, in consideration of insulation and mechanical strength, the inner housing may further include a fifth reinforcement part 167 having one side surface formed in a shape partially corresponding to an outer surface of the insulating rod 151 to be disposed to face the insulating rod 151.

The fifth reinforcement part 167 may be formed to have a height greater than that of the first reinforcement part 163 and protrude with respect to the front portion 161 to come into contact with the insulating rod 151 or to be spaced apart from the insulating rod 151 at a predetermined interval.

The inner housing 160 according to the embodiment of the present disclosure may be formed of an insulating material, and the components constituting the inner housing 160 may be connected by an adhesive or integrally formed by an injection method or the like.

The above-described pole component 100 may be included in the circuit breaker 10 according to the embodiment of the present disclosure.

Specifically, the circuit breaker 10 according to the embodiment of the present disclosure may include the pole component 100 including all or some of the above-described technical spirit, and the frame 200 accommodated in the switchboard which is not shown, and on which at least one pole component 100 is disposed.

In order to fix the pole component 100 to the frame 200, the frame 200 may be formed with a first hole (not shown), the outer housing 140 may be formed with a second hole 142 facing the first hole, the inner housing 160 may be formed with a third hole 160a facing the first hole and the second hole 142, and the frame 200 may further include fastening bolts 210 which are fastened through the first hole to the third hole 160a.

With this fastening, the inner housing 160 may be secondarily solidly fixed to the outer housing 140.

Further, the inner housing 160 may further include a cylindrical sixth reinforcement part 168 having a shape corresponding to the third hole 160a and protruding in a direction toward the breaker part assembly 130, and may further include a seventh reinforcement part 169 formed between the pair of side surface portions 162 facing each other with the sixth reinforcement part 168 therebetween and the first reinforcement part 163

In short, the present disclosure may dispose the inner housing 160 including a structure capable of blocking the electrical interference and improving the mechanical strength between the outer housing 140 and the breaker part assembly 130 to improve durability and safety of the pole component 100, and since the inner housing 160 is easily detachable, there is an advantage in that maintenance and repair of the pole component 100 may be facilitated.

From the above description, those skilled in the art may know that various changes and modifications may be performed within the scope not departing from the technical spirit of the present disclosure, and the technical scope of the present disclosure is not limited to the contents described in the embodiments, but should be determined by the claims and their equivalents.

The invention claimed is:

1. A pole component comprising:
   an upper terminal;
   a lower terminal disposed to be spaced apart from the upper terminal at a predetermined interval;
   a breaker part assembly including a fixed electrode electrically connected to the upper terminal, a movable electrode selectively connected to the fixed electrode, and a current conducting portion fixed to the movable electrode and electrically connected to the lower terminal;
   an outer housing having an open lower surface to accommodate the upper terminal, the lower terminal, and the breaker part assembly; and
   an inner housing detachably disposed between the outer housing and breaker part assembly, wherein the inner housing includes:
   a plate-shaped front portion disposed to face an inner surface of the outer housing; and
   a pair of side surface portions formed to extend from both sides of the front portion in a direction toward the breaker part assembly.

2. The pole component of claim 1, further comprising a lever part which spaces the movable electrode apart from the fixed electrode when an external force is applied.

3. The pole component of claim 2, wherein the lever part includes:
   an insulating rod disposed under the movable electrode;
   a movable member fixed to the insulating rod;
   a hinge pin disposed through the outer housing;
   a lever having one end formed with a hinge hole through which the hinge pin passes, the other end accommodated in the outer housing to be exposed to an outside of the outer housing, and a middle fixed to the movable member; and
   an elastic body disposed between the movable member and the lever.

4. The pole component of claim 3, wherein the inner housing is disposed in the outer housing to come into contact with at least one of the lower terminal, the inner surface of the outer housing, the breaker part assembly, and the lever part.

5. The pole component of claim 1, wherein a seating groove recessed in a shape corresponding to an outer surface of the lower terminal is formed at an upper side of the front portion.

6. The pole component of claim 3, wherein hinge grooves are formed in the pair of side surface portions so that the hinge pin passes therethrough.

7. The pole component of claim 1, wherein the inner housing further includes at least one or more first reinforcement parts each having one end and the other end respectively disposed at the pair of side surface portions.

8. The pole component of claim 7, wherein the one or more first reinforcement parts each have a plate shape and is integrally formed with the inner housing.

9. The pole component of claim 1, wherein the inner housing further includes:
   at least one or more second reinforcement parts formed to extend from the front portion to face the pair of side surface portions; and
   at least one or more third reinforcement parts each having one end and the other end disposed between the second reinforcement parts and the pair of side surface portions.

10. The pole component of claim 9, further comprising at least one or more fourth reinforcement parts formed between the at least one or more second reinforcement parts and the pair of side surface portions to face the at least one or more second reinforcement parts or the pair of side surface portions, and each having one end and the other end respectively disposed at one of the one or more first reinforcement parts and one of the one or more third reinforcement parts.

11. The pole component of claim 3, wherein the inner housing further includes a fifth reinforcement part having one side surface formed in a shape partially corresponding to an outer surface of the insulating rod to be disposed to face the insulating rod.

12. A circuit breaker comprising:
   the pole component of claim 1; and
   a frame accommodated in a switchboard and in which at least one or more pole components are disposed.

13. The circuit breaker of claim 12, wherein:
   the frame is formed with a first hole;
   the outer housing is formed with a second hole facing the first hole; and
   the inner housing is formed with a third hole facing the first hole and the second hole; and
   the frame further comprises fastening bolts which are fastened through the first hole to the third hole.

14. The circuit breaker of claim 13, wherein the inner housing further includes a cylindrical sixth reinforcement part having a shape corresponding to the third hole and protruding in a direction toward the breaker part assembly.

* * * * *